R. TERRELL.
Bale-Tie.

No. 161,177.

Patented March 23, 1875.

WITNESSES:
H. N. Jenkins
J. C. Hubbell

INVENTOR
Richard Terrell

UNITED STATES PATENT OFFICE

RICHARD TERRELL, OF NEW ORLEANS, LOUISIANA.

IMPROVEMENT IN BALE-TIES.

Specification forming part of Letters Patent No. 161,177, dated March 23, 1875; application filed March 4, 1875.

CASE A.

*To all whom it may concern:*

Be it known that I, RICHARD TERRELL, a resident of the city of New Orleans and State of Louisiana, have invented a certain new and useful Improvement in Bale-Ties; and I do hereby declare the following to be a full, clear, and correct description of the same, reference being had to the annexed drawing, making a part of this specification.

My invention relates to an improved device for securing together the ends of metal bands surrounding bales of cotton or other merchandise. It consists of a flat metallic plate, the sides of which are turned up at right angles to the body of the plate, and connected together by two bars of same material. The lower or bottom side of the plate is provided, on a central line, with two cleats or hooks, the object of which will readily be understood by referring to the accompanying drawing, on which—

Figure 1:
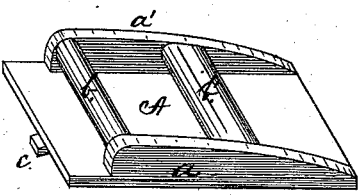
Figure 2:
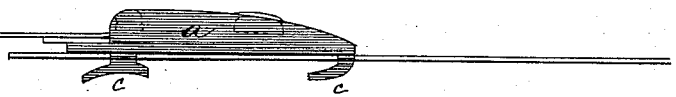
Figure 3:
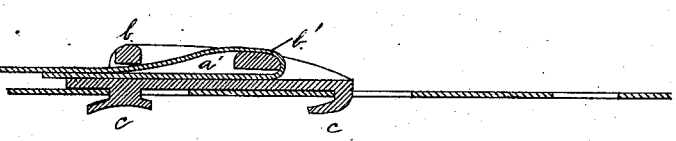

Figure 1 is a perspective view of my device. Fig. 2 is a side view of the invention, with the two ends of a bale-band secured thereto as in the nature of the invention; and Fig. 3 is a longitudinal section of Fig. 2.

My improved tie-plate may be made of cast, wrought, or malleable iron, or of any other suitable metal On the drawing, A represents the flat portion of my device, while $a\ a'$ show the raised sides thereof, and $b\ b'$ the two bars by which the said sides are connected together. The special object of these bars will presently be described.

The plate A is provided, upon its lower or bottom side, on a line directly in the center and near the extreme ends thereof, with the cleats or hooks $c\ c'$, which are designed to engage the perforated end of a bale-band, as shown in the two latter figures of the drawing. The first end of the band is secured to the device by passing it through the space between the bar $b$ and plate A, and by drawing it through over the bar $b'$, and returning it again under the said bars $b$ and $b'$, as shown. The plate A is made to extend beyond the bar $b$, in order to increase the friction-surface, opposed to the folded end of the band, as well as to prevent the said end from resting against the contents of the bale without, in any manner, depending upon the expansion of the bale so to do.

Having described my invention, what I claim as new, and desire to secure by Letters Patent, is—

The bale-tie herein described, consisting of the plate A, provided with bars $b\ b'$, sides $a\ a'$, and cleats or hooks $c\ c'$, as described, and for the purpose specified.

RICHARD TERRELL.

Witnesses:
ANDREW HERO, Jr.,
H. N. JENKINS.